United States Patent
Yu

(10) Patent No.: US 10,521,216 B2
(45) Date of Patent: Dec. 31, 2019

(54) UNIFIED EXTENSIBLE FIRMWARE INTERFACE UPDATES

(71) Applicant: Oracle International Corporation, Redwood Shores, CA (US)

(72) Inventor: Yadong Yu, Needham, MA (US)

(73) Assignee: Oracle International Corporation, Redwood Shores, CA (US)

( * ) Notice: Subject to any disclaimer, the term of this patent is extended or adjusted under 35 U.S.C. 154(b) by 44 days.

(21) Appl. No.: 15/408,033

(22) Filed: Jan. 17, 2017

(65) Prior Publication Data

US 2018/0203682 A1     Jul. 19, 2018

(51) Int. Cl.
*G06F 8/65*           (2018.01)
*G06F 9/4401*      (2018.01)

(52) U.S. Cl.
CPC .............. *G06F 8/65* (2013.01); *G06F 9/4405* (2013.01); *G06F 9/4406* (2013.01); *G06F 9/4411* (2013.01)

(58) Field of Classification Search
CPC . G06F 8/65; G06F 8/70; G06F 9/4405; G06F 9/4406; G06F 9/4411
USPC ........................................................ 717/168
See application file for complete search history.

(56) References Cited

U.S. PATENT DOCUMENTS

| | | | |
|---|---|---|---|
| 6,438,688 B1 * | 8/2002 | Nunn ........................ | G06F 8/65 709/220 |
| 7,159,105 B2 | 1/2007 | Rothman et al. | |
| 7,448,030 B2 | 11/2008 | Liu et al. | |
| 8,082,436 B2 | 12/2011 | Harmer | |
| 8,086,838 B2 | 12/2011 | Harmer | |
| 8,201,163 B2 | 6/2012 | Walker | |
| 8,321,655 B2 | 11/2012 | Jones | |
| 8,321,656 B2 | 11/2012 | Jones | |
| 8,386,618 B2 | 2/2013 | Bailey et al. | |
| 8,468,332 B2 | 6/2013 | Jones | |
| 8,468,514 B2 | 6/2013 | Dang | |

(Continued)

OTHER PUBLICATIONS

Bricker, "Unified Extensible Firmware Interface (UEFI) and Secure Boot: Promise and Pitfalls", [Online], 2013, pp. 60-63, [Retrieved from internet on Aug. 12, 2019], <http://delivery.acm.org/10.1145/2530000/2527159/p60-bricker.pdf?ip=151.207.250.22&id=2527159&acc=PUBLIC&key=C15944E53D0ACA63%2E4D4702B> (Year: 2013).*

(Continued)

*Primary Examiner* — S. Sough
*Assistant Examiner* — Zengpu Wei
(74) *Attorney, Agent, or Firm* — Kilpatrick Townsend & Stockton, LLP

(57) ABSTRACT

A method of executing processor-specific code to include board-specific optimizations in a Unified Extensible Firmware Interface (UEFI) may include executing first instructions that are specific to a processor, where the first instructions may be executed within a UEFI firmware routine. The method may also include detecting a portion of the first instructions that requires information to be processed or provided by second instructions, where the second instructions may be specific to a circuit board on which the processor is installed. The method may further include sending, through an intermediate dispatch function, a request for the information to be processed or provided by the second instructions, where the intermediate dispatch function can decouple the first instructions from the second instructions.

48 Claims, 7 Drawing Sheets

(56) References Cited

U.S. PATENT DOCUMENTS

| | | | |
|---|---|---|---|
| 8,484,631 B2 | 7/2013 | Mortensen | |
| 8,527,744 B2 | 9/2013 | Jones et al. | |
| 8,583,908 B2 | 11/2013 | Zimmer et al. | |
| 8,726,258 B2 | 5/2014 | Mortensen | |
| 9,021,244 B2 | 4/2015 | Bobzin | |
| 9,081,734 B2 | 7/2015 | Soderlund et al. | |
| 9,176,752 B1* | 11/2015 | Marr | G06F 9/4411 |
| 9,189,351 B2 | 11/2015 | Chen et al. | |
| 9,208,105 B2 | 12/2015 | Prakash et al. | |
| 9,372,754 B2 | 6/2016 | Soderlund et al. | |
| 9,411,605 B2 | 8/2016 | Bisht | |
| 9,477,848 B2 | 10/2016 | Nicholes | |
| 9,507,581 B2 | 11/2016 | Butcher et al. | |
| 9,507,604 B2 | 11/2016 | Huang et al. | |
| 9,524,390 B2 | 12/2016 | Kulkarni et al. | |
| 9,558,016 B2 | 1/2017 | Cho | |
| 9,563,439 B2 | 2/2017 | Khatri et al. | |
| 9,569,620 B2 | 2/2017 | Chaiken et al. | |
| 9,575,791 B2 | 2/2017 | Martinez et al. | |
| 9,582,393 B2 | 2/2017 | Wynn | |
| 9,589,139 B2 | 3/2017 | Bobzin | |
| 9,589,156 B2 | 3/2017 | Prakash et al. | |
| 9,594,567 B2 | 3/2017 | O'Rourke et al. | |
| 9,612,846 B2* | 4/2017 | Puthillathe | G06F 9/4406 |
| 9,639,700 B2 | 5/2017 | Campbell et al. | |
| 9,678,767 B2 | 6/2017 | Berlin et al. | |
| 9,703,346 B2 | 7/2017 | Mudusuru et al. | |
| 9,703,635 B2 | 7/2017 | Hagiwara et al. | |
| 9,721,101 B2 | 8/2017 | Jones et al. | |
| 9,767,118 B2 | 9/2017 | Singh et al. | |
| 9,824,226 B2 | 11/2017 | Ouyang et al. | |
| 9,830,457 B2 | 11/2017 | Vidyadhara et al. | |
| 9,842,210 B2 | 12/2017 | Rose | |
| 9,858,087 B2 | 1/2018 | Chen | |
| 9,870,474 B2 | 1/2018 | Bobzin et al. | |
| 9,881,158 B2 | 1/2018 | Western et al. | |
| 9,886,580 B2 | 2/2018 | Dasar et al. | |
| 10,235,183 B2* | 3/2019 | Costa | G06F 9/4401 |
| 2003/0188146 A1* | 10/2003 | Hale | G06F 9/30101 713/1 |
| 2005/0131822 A1* | 6/2005 | Gardner | G06Q 20/1085 705/43 |
| 2005/0240669 A1* | 10/2005 | Khanna | G06F 9/4405 709/225 |
| 2007/0050611 A1* | 3/2007 | Weikel | G06F 9/4406 713/2 |
| 2008/0274787 A1* | 11/2008 | Yoshizawa | G07F 17/32 463/20 |
| 2009/0172381 A1 | 7/2009 | Zimmer et al. | |
| 2009/0327741 A1 | 12/2009 | Zimmer et al. | |
| 2010/0011197 A1 | 1/2010 | Harmer | |
| 2010/0042821 A1 | 2/2010 | Harmer | |
| 2010/0083002 A1 | 4/2010 | Cui et al. | |
| 2010/0318776 A1 | 12/2010 | Jones | |
| 2010/0318777 A1 | 12/2010 | Jones | |
| 2010/0318778 A1 | 12/2010 | Jones | |
| 2010/0318779 A1 | 12/2010 | Jones | |
| 2010/0318962 A1 | 12/2010 | Jones et al. | |
| 2011/0271268 A1* | 11/2011 | Dang | G06F 9/4426 717/168 |
| 2012/0254831 A1 | 10/2012 | Mortensen | |
| 2012/0266148 A1* | 10/2012 | Mortensen | G06F 8/71 717/163 |
| 2013/0104188 A1 | 4/2013 | Western et al. | |
| 2013/0124843 A1 | 5/2013 | Bobzin | |
| 2013/0290778 A1 | 10/2013 | Soderlund et al. | |
| 2013/0304979 A1* | 11/2013 | Zimmer | G06F 13/14 711/103 |
| 2014/0136828 A1 | 5/2014 | Lewis et al. | |
| 2014/0237220 A1 | 8/2014 | O'Rourke et al. | |
| 2014/0281577 A1 | 9/2014 | Nicholes | |
| 2014/0297999 A1* | 10/2014 | Kim | G06F 9/4401 713/1 |
| 2014/0331037 A1 | 11/2014 | Lewis | |
| 2014/0380031 A1 | 12/2014 | Jones et al. | |
| 2015/0067317 A1 | 3/2015 | Bisht | |
| 2015/0199517 A1 | 7/2015 | Rose | |
| 2015/0227427 A1 | 8/2015 | Soderlund et al. | |
| 2015/0235030 A1 | 8/2015 | Chaiken et al. | |
| 2015/0370302 A1 | 12/2015 | Mudusuru et al. | |
| 2015/0370576 A1 | 12/2015 | Wynn | |
| 2015/0378846 A1 | 12/2015 | Hagiqara et al. | |
| 2016/0070913 A1 | 3/2016 | Kulkarni et al. | |
| 2016/0103693 A1 | 4/2016 | Berlin et al. | |
| 2016/0154820 A1 | 6/2016 | Singh et al. | |
| 2016/0180094 A1 | 6/2016 | Dasar et al. | |
| 2016/0188345 A1* | 6/2016 | Chen | G06F 9/4403 713/2 |
| 2016/0253501 A1 | 9/2016 | Wynn | |
| 2016/0275291 A1 | 9/2016 | Campbell et al. | |
| 2016/0314002 A1 | 10/2016 | Khatri et al. | |
| 2016/0328564 A1 | 11/2016 | Vidyadhara et al. | |
| 2016/0364243 A1 | 12/2016 | Puthillathe et al. | |
| 2017/0068548 A1* | 3/2017 | Dasar | G06F 9/4401 |
| 2017/0098084 A1 | 4/2017 | Kulkarni et al. | |
| 2017/0154185 A1 | 6/2017 | Chaiken et al. | |
| 2017/0161080 A1 | 6/2017 | Wynn | |
| 2017/0177875 A1 | 6/2017 | O'Rourke et al. | |
| 2017/0270301 A1 | 9/2017 | Vidyadhara et al. | |
| 2017/0337064 A1 | 11/2017 | Vidyadhara et al. | |
| 2018/0121208 A1* | 5/2018 | Mikami | G06F 9/4405 |
| 2018/0157475 A1* | 6/2018 | Dailey | G06F 8/65 |

OTHER PUBLICATIONS

Khanna et al, "Unified Extensible Firmware Interface: An Innovative Approach to DRAM Power Control", [Online], 2011, pp. 1-6, [Retrieved form internet on Aug. 12, 2019], <https://ieeexplore.ieee.org/stamp/stamp.jsp?tp=&arnumber=6136703> (Year: 2011).*

Zimmer, "Platform Trust Beyond BIOS Using the Unified Extensible Firmware Interface", [Online], 2007, pp. 1-6, [Retrieved from internet on Aug. 12, 2019], <https://pdfs.semanticscholar.org/0bd3/bdeb6dcadf088137e13c00adc7e4390fa0de.pdf> (Year: 2007).*

* cited by examiner

UNIFIED EXTENSIBLE FIRMWARE INTERFACE UPDATES

BACKGROUND

Many chip manufacturers (e.g., CPU vendors) provide customers, such as Original Electronic Manufacturers (OEMs) with reference code packages for each new CPU and chipset generation as they are released. The reference codes are incorporated into the OEM systems and firmware, such as the Basic Input/Output Settings (BIOS), and thereby indicate how the OEM system and/or firmware should be initialized and configured during boot and initialization procedures.

A common type of firmware embedded in OEM systems may include one or more Unified Extensible Firmware Interface (UEFI) components, each performing as a programming interface between the operating system (OS) of the system and the embedded firmware of the system. The UEFI component also performs the function of platform initialization. A challenge of using UEFI arises from the large amount of effort required to incorporate the reference codes into existing OEM systems, as the typical reference code package includes hundreds or thousands of files. Conventional methodologies require modifications be made to reference code package files and/or OEM system files directly, which is time-consuming, labor-intensive, and expensive.

BRIEF SUMMARY

In some embodiments, a method of executing processor-specific code to include board-specific optimizations in a Unified Extensible Firmware Interface (UEFI) may include executing first instructions that are specific to a processor, where the first instructions may be executed within a UEFI firmware routine. The method may also include detecting a portion of the first instructions that requires information to be processed or provided by second instructions, where the second instructions may be specific to a circuit board on which the processor is installed. The method may additionally include sending, through an intermediate dispatch function, a request for the information to be processed or provided by the second instructions, where the intermediate dispatch function can decouple the first instructions from the second instructions.

In some embodiments, a non-transitory, computer-readable medium including instructions that, when executed by one or more processors, may cause the one or more processors to perform operations including executing first instructions that are specific to a processor, where the first instructions may be executed within a UEFI firmware routine. The operations may also include detecting a portion of the first instructions that requires information to be processed or provided by second instructions, where the second instructions may be specific to a circuit board on which the processor is installed. The operations may additionally include sending, through an intermediate dispatch function, a request for the information to be processed or provided by the second instructions, where the intermediate dispatch function can decouple the first instructions from the second instructions.

In some embodiments, a system may be presented. The system may include one or more processors and one or more memory devices. The one or more memory devices may comprise instructions that, when executed by the one or more processors, cause the one or more processors to perform operations including executing first instructions that are specific to a processor, where the first instructions may be executed within a UEFI firmware routine. The operations may also include detecting a portion of the first instructions that requires information to be processed or provided by second instructions, where the second instructions may be specific to a circuit board on which the processor is installed. The operations may additionally include sending, through an intermediate dispatch function, a request for the information to be processed or provided by the second instructions, where the intermediate dispatch function can decouple the first instructions from the second instructions.

In any embodiment, one or more of the following features may be implemented in any combination and without limitation. The method/operations may also include receiving, through the intermediate dispatch function, results processed by the second instructions; and continuing execution of the first instructions. The method/operations may also include receiving, through the intermediate dispatch function, an indication that the second instructions have successfully executed; and continuing execution of the first instructions. The first instructions may be part of a processor reference code module provided from a manufacturer of the processor. The second instructions be part of a board customization module provided by a manufacturer of the circuit board. The intermediate dispatch function need not require any static links between the first instructions and the second instructions. The information to be processed or provided by the second instructions may include a set of initialization parameters. The request for the information to be processed or provided by the second instructions may include an execution context of the first instructions. The execution context of the first instructions may include chipset devices and subcomponent topology data that require a board-specific initialization. The execution context of the first instructions may include chipset configuration policy tokens that require a board-specific override. The execution context of the first instructions may include chipset initialization health data that requires board-specific processing. The method/operations may further include casting, by the intermediate dispatch function, the execution context of the first instructions into a void pointer, such that the second instructions are not required to use data structures that are specific to the first instructions. The method/operations may additionally include receiving, from the second instructions, a void pointer referencing results of the second instructions; and casting, by the intermediate dispatch function, the void pointer into a data type required by the first instructions. The method/operations may further include generating, at the intermediate dispatch function, a unique ID for the request. The method/operations may also include passing the unique ID to the second instructions as a function parameter in a call stack. The method/operations may further include generating, at the intermediate dispatch function, a plurality of unique IDs from the unique ID that are assigned to forked processes executed by the second instructions. Each of the plurality of unique IDs may target specific board-specific customization functions. The processor may include a CPU or chipset.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
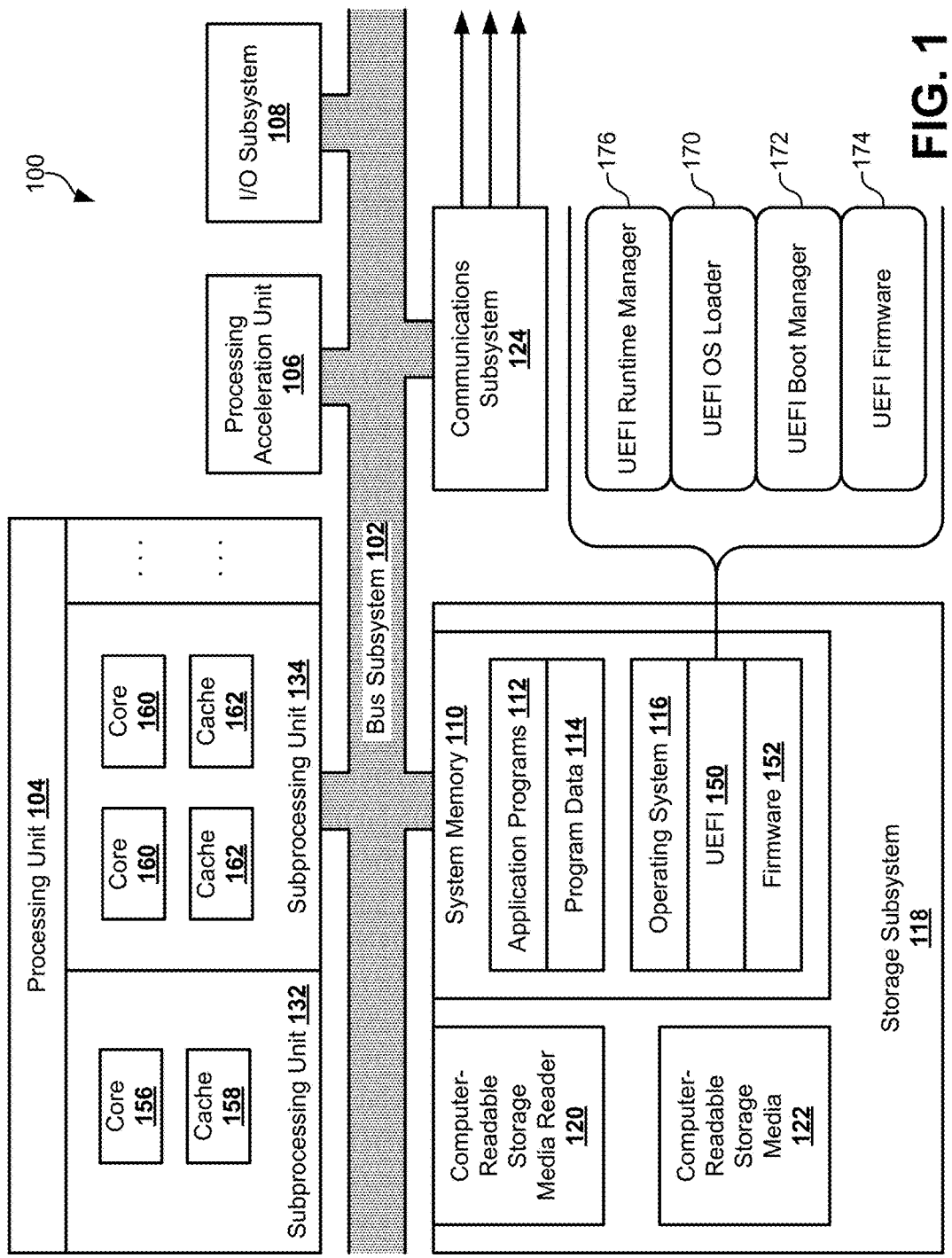
FIG. 1 illustrates an computer system that includes a Unified Extensible Firmware Interface (UEFI), according to some embodiments.

FIG. 1 illustrates an computer system 100 that includes a Unified Extensible Firmware Interface (UEFI), according to some embodiments. As shown in the FIG. 1, computer system 100 includes a processing unit 104 that communicates with a number of peripheral subsystems via a bus subsystem 102. These peripheral subsystems may include a processing acceleration unit 106, an I/O subsystem 108, a storage subsystem 118, and a communications subsystem 124. Storage subsystem 118 includes tangible computer-readable storage media 122 and a system memory 110. The system memory includes A UEFI 150 that further includes a UEFI Operating System (OS) Loader 170, a UEFI boot manager 172, and UEFI firmware 174.

Bus subsystem 102 provides a mechanism for letting the various components and subsystems of computer system 100 communicate with each other as intended. Although bus subsystem 102 is shown schematically as a single bus, alternative embodiments of the bus subsystem may utilize multiple buses. Bus subsystem 102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 104, which can be implemented as one or more integrated circuits (e.g., a conventional microprocessor or microcontroller), controls the operation of computer system 100. One or more processors may be included in processing unit 104. These processors may include single core or multicore processors. In certain embodiments, processing unit 104 may be implemented as one or more independent subprocessing units 132 and/or 134 with single or multicore processors 156 and/or 160 included in each subprocessing unit 132, 134. In other embodiments, processing unit 104 may also be implemented as a quad-core processing unit formed by integrating two dual-core processors into a single chip. Each processor 156, 160 may have associated therewith a local cache 158, 162.

In various embodiments, processing unit 104 can execute a variety of programs in response to program code and can maintain multiple concurrently executing programs or processes. At any given time, some or all of the program code to be executed can be resident in processor(s) 104 and/or in storage subsystem 118. Through suitable programming, the processors 156, 160 in the processing unit 104 can provide various functionalities described above. Computer system 100 may additionally include a processing acceleration unit 106, which can include a digital signal processor (DSP), a special-purpose processor, a Graphics Processing Unit (GPU), and/or the like.

I/O subsystem 108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands. Any embodiments described herein that receive user inputs may receive such inputs through any of the user interface input devices/methods described above.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 100 may comprise a storage subsystem 118 that comprises software elements, shown as being currently located within a system memory 110. System memory 110 may store program instructions that are loadable and executable on processing unit 104, as well as data generated during the execution of these programs.

Depending on the configuration and type of computer system 100, system memory 110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 104. In some implementations, system memory 110 may include multiple different types of memory, such as static random access memory (SRAM) or dynamic random access memory (DRAM). In some implementations, a basic input/output system (BIOS), containing the basic routines that help to transfer information between elements within computer system 100, such as during start-up, may typically be stored in the ROM.

In some embodiments, the BIOS may be supplemented and/or replaced by the UEFI 150, which comprises a software interface that operates between the operating system 116 and the platform firmware 152, allowing it to be capable of replacing the BIOS. The UEFI provides driver support, interfaces, and services, and may include a shell that allows users to execute applications on a command line interface through the UEFI firmware interface 174. The UEFI may include contains system information organized into tables, and it offers boot and runtime services to the operating system. Boot services may be executed by a UEFI boot manager 172 to include initialization, file services, and textual and graphical user consoles. Runtime services may be provided by the UEFI runtime manager 176 to include date, time, and NVRAM services. To enable or facilitate inter-device communication, all UEFI drivers and components may communicate through specified protocols. Because the UEFI Byte Code (UBC), is a processor-independent environment that allows for both device initialization and operation (with the exception of OS-specific hardware with specific feature and driver support requirements, such as high-end graphics cards), the drivers may be required to interface with specific hardware through the UEFI firmware interface 174.

By way of example, and not limitation, system memory 110 also illustrates application programs 112, which may include client applications, Web browsers, mid-tier applications, relational database management systems (RDBMS), etc., program data 114, and an operating system 116. The UEFI OS loader 170 can load various operating systems, including for example, various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 118 may also provide a tangible computer-readable storage medium for storing the basic programming and data constructs that provide the functionality of some embodiments. Software (programs, code modules, instructions) that when executed by the processing unit 104 provide the functionality described above may be stored in storage subsystem 118. Storage subsystem 118 may also provide a repository for storing data used in accordance with the embodiments described herein.

Storage subsystem 100 may also include a computer-readable storage media reader 120 that can further be connected to computer-readable storage media 122. Together and, optionally, in combination with system memory 110, computer-readable storage media 122 may comprehensively represent remote, local, fixed, and/or removable storage devices plus storage media for temporarily and/or more permanently containing, storing, transmitting, and retrieving computer-readable information.

Computer-readable storage media 122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 100.

By way of example, computer-readable storage media 122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 122 may include, but is not limited to, Zip® drives, flash memory cards, universal serial bus (USB) flash drives, secure digital (SD) cards, DVD disks, digital video tape, and the like. Computer-readable storage media 122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 100.

Communications subsystem 124 provides an interface to other computer systems and networks. Communications subsystem 124 serves as an interface for receiving data from and transmitting data to other systems from computer system 100. For example, communications subsystem 124 may enable computer system 100 to connect to one or more devices via the Internet. In some embodiments communications subsystem 124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 124 can provide wired network connectivity (e.g., Ethernet) in addition to or instead of a wireless interface.

Computer system 100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

The UEFI 150 provides an interface between standard operating systems and very specific, individual arrangements of the underlying hardware described above for computer system 100. Specifically, the UEFI 150 may provide code to initialize a specific CPU chipset of a particular generation and the operating system. When a CPU vendor releases a new CPU chipset and/or releases updated code for an existing CPU chipset, the OEMs that provide the motherboard and other computer system 100 components may need to receive updated code modules for their UEFI. CPU vendors may provide OEMs with new/updated reference codes and/or reference code modules corresponding a new CPU and chipset generation. The reference code and/or reference code modules may contain code that defines new initialization and boot procedures and configurations for a particular CPU generation and/or chipset. The reference codes can be incorporated into the existing OEM systems and firmware.

In particular, the UEFI firmware used by the OEM may have been implemented according to a standard UEFI specification. Generally, a UEFI specification defines a model for the interface between operating systems and platform firmware in order to standardize the development and deployment of UEFI modules. Specifically, the UEFI Interface may include data tables that contain platform-related information, as well as boot and runtime service calls that are available to the operating system 116 and the OS loader 170 for a given OEM platform or system. Together, the data tables and platform-related information provide a standard environment for booting an operating system 116 and running pre-boot applications within such OEM systems. Thus, a UEFI specification provides a set of software services that facilitate the boot of the operating system 116 that is installed or otherwise maintained within an OEM system or device.

The systems designed and implemented by OEMs may vary considerably. For example, systems may be designed to meet varying system requirements, which may include thermal and power optimization requirements, variations in device topology, and individual Reliability, Availability, and Serviceability (RAS) requirements. Therefore, any reference codes that are integrated and reconciled within the existing UEFI firmware have most likely been customized with the OEM platform-specific parameters and/or other functional customizations and configurations. When the reference codes are integrated in the UEFI to work with the existing parameters and customizations, typically both the reference code files and the source code currently supporting the specific parameters and customizations of the OEM system may be directly modified. However, because the source files may be very large in size and complicated in nature, the integrating new reference codes into an existing UEFI can be a very time-consuming, labor-intensive, and error-prone process.

As described above, the UEFI firmware 174 is one of the key components that initializes the CPU and chipset hardware to specific settings that optimize power and performance. New CPU technology is released every couple of years. In order to increase the speed with which the OEM industry adopts the new CPU technology, CPU vendors, such as Intel®, will provide OEMs with reference code specifically designed for the new CPU chipset generations. The reference code can be incorporated with the OEMs own UEFI firmware and platforms in order to support the new technology. The UEFI based reference code package from CPU vendors normally includes many hundreds of source files, with some files as large as 10,000 lines of code. During the typical multi-year lifecycle of a CPU chipset, new reference code is supplied once every few weeks. Each time a new reference codes that is available to fix bugs or otherwise upgrade the operation of the CPU chipset, the OEMs need to respond by integrating the reference code with existing UEFI firmware for their motherboards.

Because each OEM may have diverse board design layouts that vary in thermal/power regulation, device topology, and/or RAS feature requirements, the reference code provided by the chipset manufacturer may need to be modified to accommodate OEM platform-specific parameters and optimizations. Traditionally, these changes were made directly within the reference source code files. However, due to the size and number of reference source code files, this traditional approaches time-consuming and error-prone. The following examples illustrate instances where new CPU reference code requires OEM-specific inputs and where the OEM may need to apply product-specific feature overwrites to the CPU reference codes. In a first example, the CPU reference code normally provides dynamic controls of its features and components through input parameters and/or options, such as enabling or disabling a sub-component (e.g., defective cores or DIMM sets, enabling or disabling certain power management features for better performance over power savings, etc.). These feature controls may be built into the reference code, and the OEM may need to change the input parameters or options to control these features prior to the reference code being executed.

In a second example, certain reference code initialization routines may require the OEM to provide inputs that include board-specific electrical parameters that establish CPU physical interfaces/links between CPUs or between CPUs and IO devices, such as USB ports. These parameters may be required due to variations in board trace length, signal routing topologies, and/or materials used during manufacture of the OEM boards. These physical differences may affect the physical interface signal integrity characteristics assumed by the reference code. Instead of providing these values prior to the execution of the reference code, these parameter values are normally provided after the reference code has started execution just prior to a point where interface training occurs.

Because of these and other difficulties that exist in the art, the embodiments described herein provide systems and/or methods for efficiently and automatically integrating UEFI reference codes into OEM UEFI firmware in a modular and decoupled manner. In various aspects, an interface may be provided that effectively decouples the UEFI reference code and/or any reference code modules from the OEM firmware and/or source code, thereby enabling the reference code to be quickly and efficiently updated without having to directly modify any OEM source code that uses the reference code. This decoupling of the OEM firmware and the UEFI reference code is applicable both during build time and boot time of the OEM system.

Figure 2:
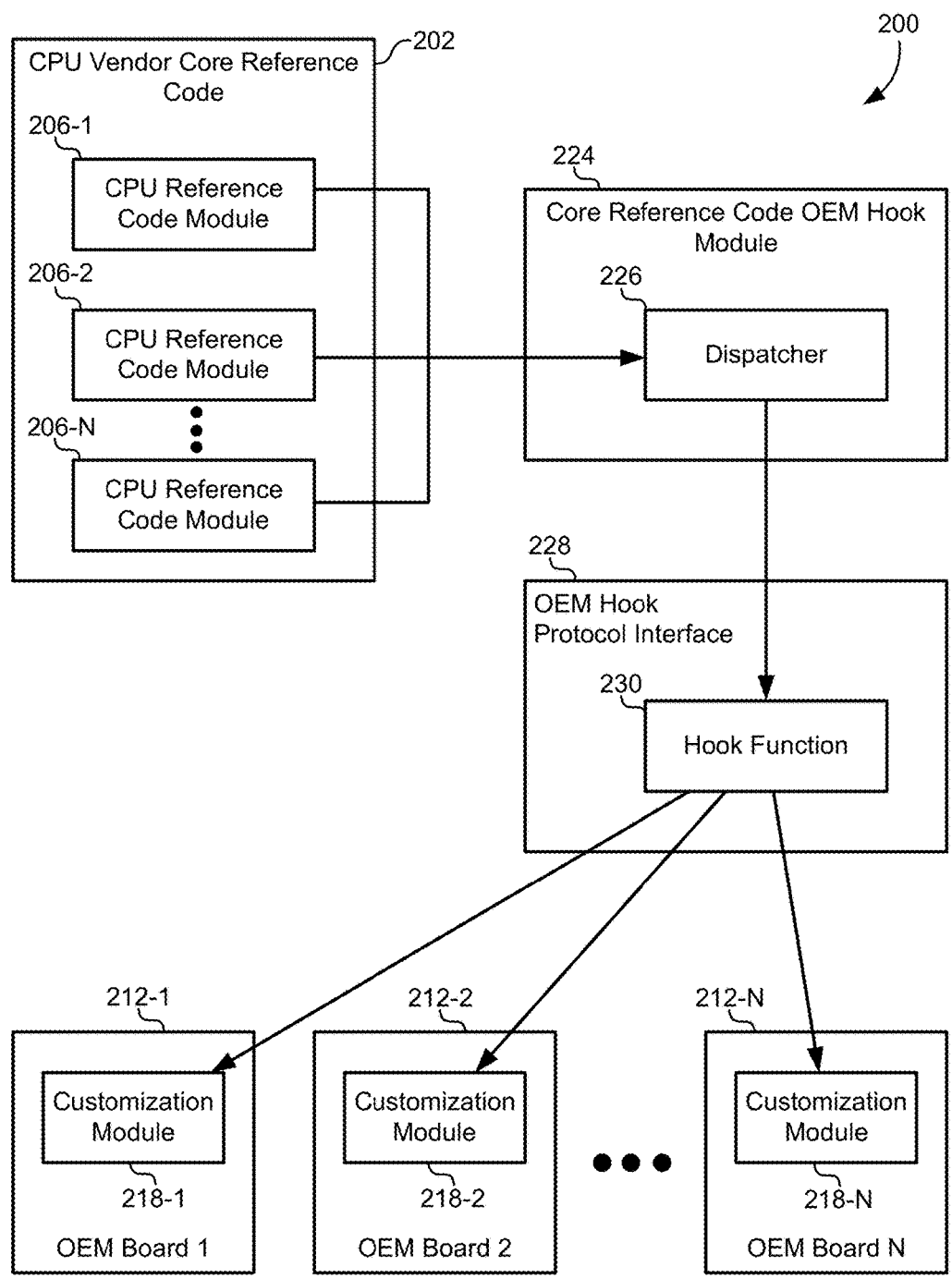
FIG. 2 illustrates a computer architecture for decoupling reference codes from OEM board customization functions, according to some embodiments.

FIG. 2 illustrates a computer architecture 200 for decoupling reference codes from OEM board customization functions, according to some embodiments. As illustrated, the computing architecture 200 includes CPU core vendor reference code 202 that includes a series of CPU reference code modules 206, each of which contain and/or otherwise define a specific set of initializations and/or boot procedures and processes for a specific generation of CPUs and/or chipsets included in the OEM circuit boards 212. Each of the OEM circuit boards 212 may contain specific data and/or function optimizations and/or customizations (illustrated as customization modules 218) that define specific and customized basic input/output settings for the particular OEM board for which they correspond.

To ensure that the OEM boards 212 are initialized with the newest generation of CPU and chipset software, the CPU reference code modules 206 and/or portions of the CPU reference code modules 206 may be integrated and/or otherwise incorporated into the optimizations and/or customizations modules 218 of the OEM boards 212. Due to the architectural arrangement of software and implemented protocols of the computing architecture 200, the integration may be achieved without directly modifying the source code of the optimizations and/or customizations modules 218 of the OEM boards 212 and/or without directly modifying the CPU reference code modules 206-210.

The CPU core vendor reference code 202 may functionally connect and/or otherwise communicate with a core reference code OEM hook module 224. Included within the OEM hook module 224 is an OEM hook dispatcher 226 that detects and intercepts any changes required at the CPU reference code modules 206 to implement modifications and/or changes at the OEM customization modules 218 of the OEM boards 212. Rather than directly modifying source code and files of the CPU reference code modules 206 and/or the OEM customization modules 218 to implement the changes required by the received reference codes, the CPU reference code modules 206 may interface with the OEM boards 212 via the OEM hook dispatcher 226, which effectively decouples the CPU reference code modules 206 from the OEM customization modules 218.

In some embodiments, to communicate with the dispatcher 226, the reference code modules 206 may send the dispatcher 226 the locations where an OEM specific customization is determined to be needed. When the dispatcher 226 is called, the reference code modules 206 may pass an identification parameter that uniquely identifies the reference code itself and the location in its execution flow or location. Additionally, a buffer pointer parameter may be passed that indicates the reference code execution context for a specific one of the OEM customization modules 218 on which to apply the customization. For those reference code modules 206 that require a board-specific policy input from the OEM customization modules 218, a return buffer pointer that can be used by the OEM customization modules 218 to pass back data needed by the reference code at the execution location through the dispatcher 226. In cases where the OEM customization modules 218 do not provide a customization for the reference code in that particular execution location, the dispatcher 226 may also include a status code parameter to indicate to the calling reference code module 206 whether or not the customization needs to be applied. The reference code does not need to apply the OEM-specific customization data when the returned status code indicates that this is not necessary.

In some embodiments, to further decouple the CPU reference codes modules 206 from the OEM customization modules 218 of the OEM boards 212, the OEM hook dispatcher 226 may communicate with an OEM Hook Protocol Interface 228, which in turn may communicate with the OEM boards 212. Allowing the OEM Hook Protocol Interface 228 to communicate with the OEM hook dispatcher 226 ensures that the OEM customization modules 218 reside outside of the CPU core reference code modules 206. This also allows any changes to be implemented without the CPU reference code modules 206 statically linking/referencing specific data types of the OEM customizations modules 218 and vice-versa. Thus, the reference codes and/or the CPU reference code modules 206 no longer need to be statically linked with the customization modules 218 of the OEM boards 212. In some embodiments, the computing architecture 200 enables the OEM customization modules 218 to be plugged into one or more of the CPU reference code modules 206 execution flow without directly and permanently changing any of the CPU reference code modules 206.

Figure 3:
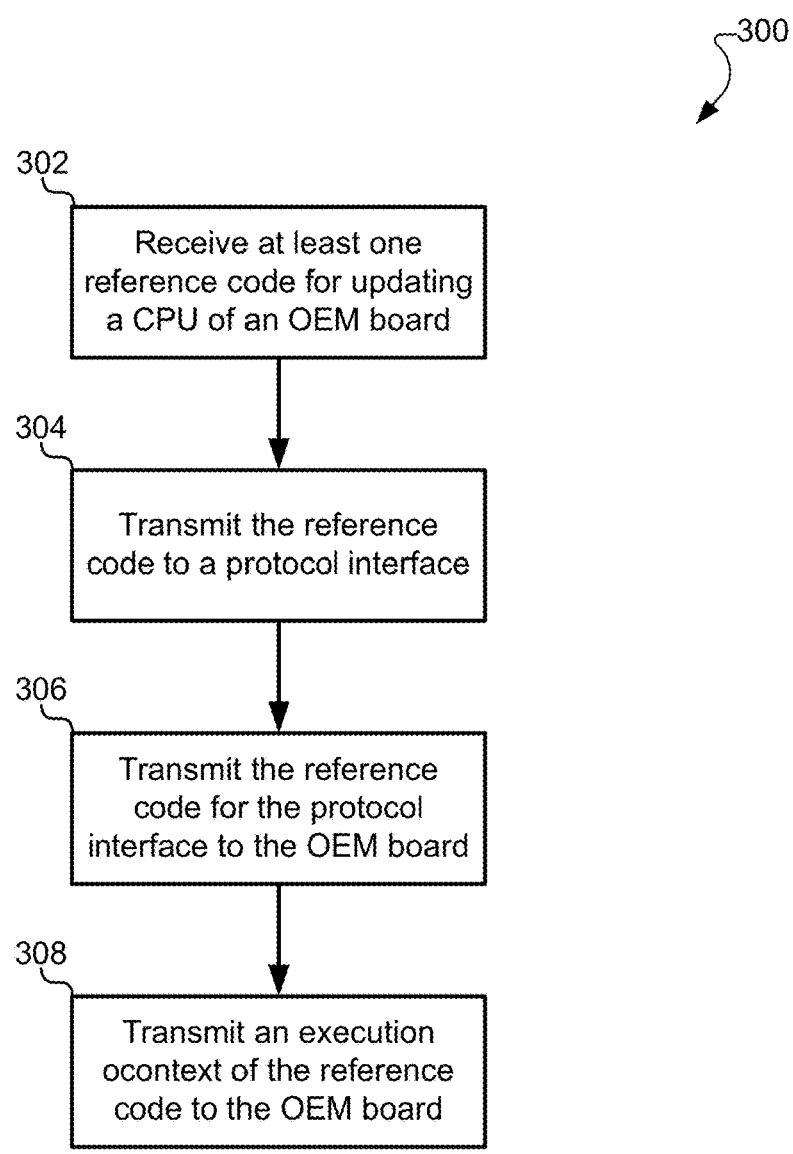
FIG. 3 illustrates a process for integrating CPU reference codes into the customization modules of OEM circuit boards.

FIG. 3 illustrates a process 200 for integrating CPU reference codes into the customization modules 218 of OEM circuit boards 212. The method may include receiving and/or detecting at least one reference code for updating a CPU and/or chipset of an OEM board (302). Referring briefly back to FIG. 2, one or more reference codes and/or reference code modules 206 of the CPU vendor reference code 202 may be received at the dispatcher 226 of the core reference code OEM hook module 224. For example, a reference code corresponding to a new CPU and chipset generation for OEM Boards 212-1 may be received at the dispatcher 226. A second reference code corresponding to another CPU and chipset generation for OEM Board 212-2 may also be received at the dispatcher 226. It is contemplated that any number of reference codes may be received and/or otherwise detected at or by the dispatcher 226.

The method may also include transmitting the at least one reference codes and/or reference code modules to a protocol interface (304). In some embodiments, the OEM dispatcher 226 may automatically transmit the at least one reference codes and/or reference code modules to the hook function 230 of the OEM Hook Protocol Interface 228. Transmitting the reference code and/or the CPU reference code module 206 to the hook function 230 of the OEM Hook Protocol Interface 228 ensures that the reference code is decoupled from the OEM Board customization modules 218 and not statically linked.

The method may additionally include transmitting the reference code from the protocol interface to an OEM board for integration into the initialization procedures of the OEM board and its corresponding CPU and/or chipset (306). The OEM Hook Protocol Interface 228 may transmit the reference code and/or CPU reference code modules 206 to one or more of the OEM boards 212. The reference code and/or CPU reference code modules 206 may then be incorporated into the firmware of the OEM boards 212 and/or the customization modules 218 of the OEM boards 212.

Figure 4:
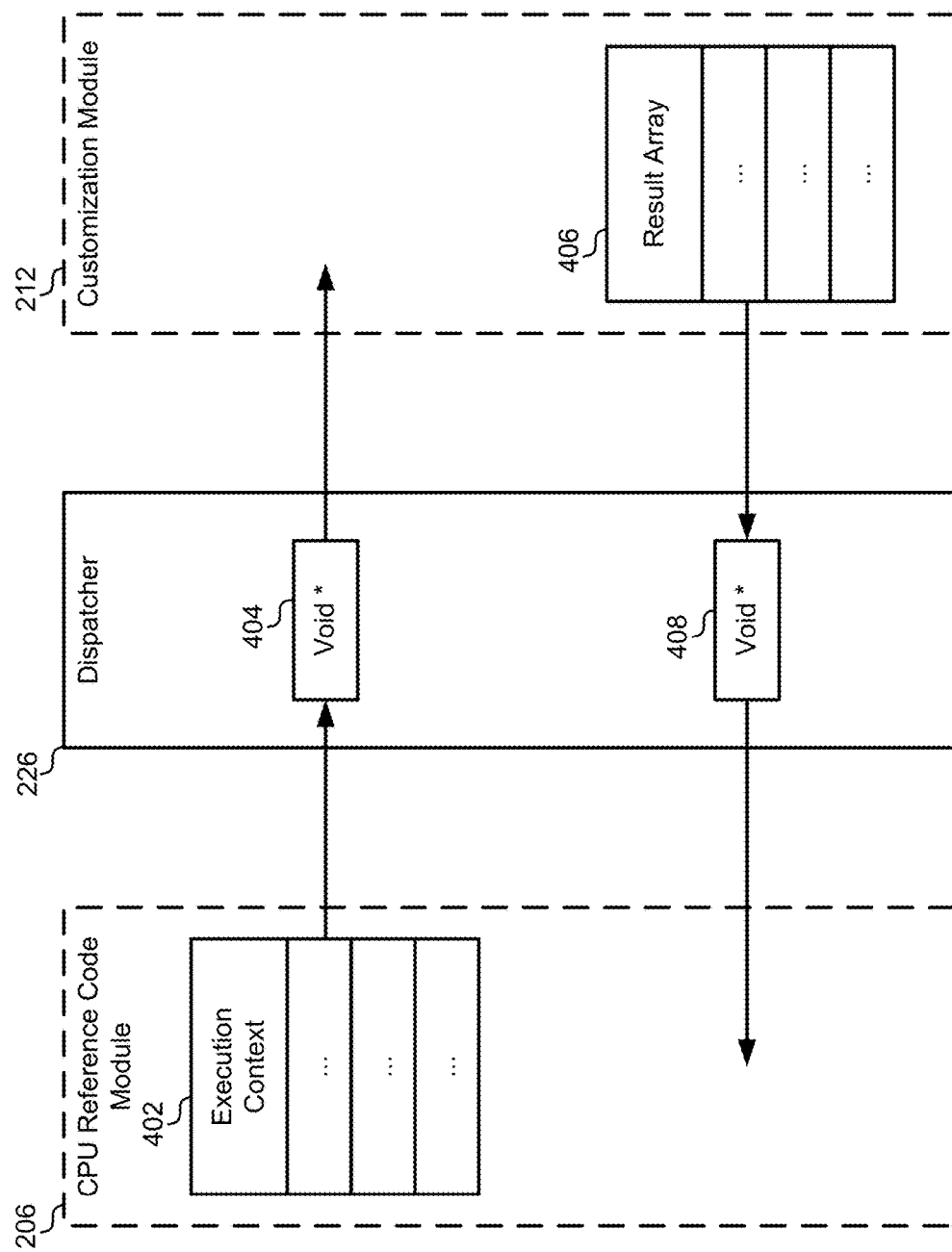
FIG. 4 illustrates a diagram of how data structures can be passed between the reference code modules and the customization modules, according to some embodiments.

The method may further include transmitting an execution context of the reference code along with the reference code to the OEM boards 212 and/or the customization modules 218 of the OEM boards 212 (308). FIG. 4 illustrates a diagram of how data structures can be passed between the reference code modules and the customization modules, according to some embodiments. Generally, an execution context 402 is a type of data structure that is specific to the reference code module and its execution flow with a location that requires an OEM customization. For example, the execution context 402 may include chipset devices and subcomponent topology data that may require an OEM-specific initialization. The execution context 402 may also include CPU or chipset configuration policy tokens that may need an OEM-board-specific override. The execution context 402 may further include CPU or chipset initialization health data that require OEM-specific processing. The OEM Hook Protocol Interface 228 and/or the dispatcher 226 may further transmit request data buffers as "void" type pointer references 404 to effectively pass the execution context 402 (e.g., state information, such as program counters, registers, and memory maps) of the CPU reference code modules 206 to the customization modules 218 of the OEM boards 212. Similarly, the results array(s) 406 generated by the customization modules 212 can be cast into a void pointer 408 through the dispatcher 226, then cast back into processor-specific data structures by the CPU reference code modules 206.

In some embodiments, to match the execution context of a CPU reference code module 206 with an OEM customization module 218, along with any associated data buffers, a unique ID may be generated, where each location in a reference code execution module 206 that requires an OEM customization is assigned a unique ID. In such embodiments, the unique ID may be passed as a function parameter in a call stack, such that the OEM customization module 206 that owns the particular customization understands (i) the association between the unique ID and the execution context of the applicable one of the CPU reference code modules 206; (ii) how to type cast the data buffers that are passed back and forth; and (iii) what response data needs to be sent back in response.

The unique IDs assigned within each CPU reference code module 206 may not be the same as the IDs seen by the OEM customization modules 218. This is because the dispatcher 226 may generate multiple unique IDs from a single reference code ID, with each forked ID targeting a specific OEM-side customization function. Generating the unique IDs in such a manner allows for multiple OEM-side customization functions—possibly in different OEM customization modules 218 for different OEM boards 212—to service a single reference code request that is dynamically selectable based on the type of the OEM board for which the reference code is being applied. This level of redirection can isolate OEM-specific customization logic for different OEM boards from the CPU core reference code logic.

It should be appreciated that the specific steps illustrated in FIG. 3 provide particular methods of integrating CPU reference codes into the customization modules according to various embodiments of the present invention. Other sequences of steps may also be performed according to alternative embodiments. For example, alternative embodiments may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
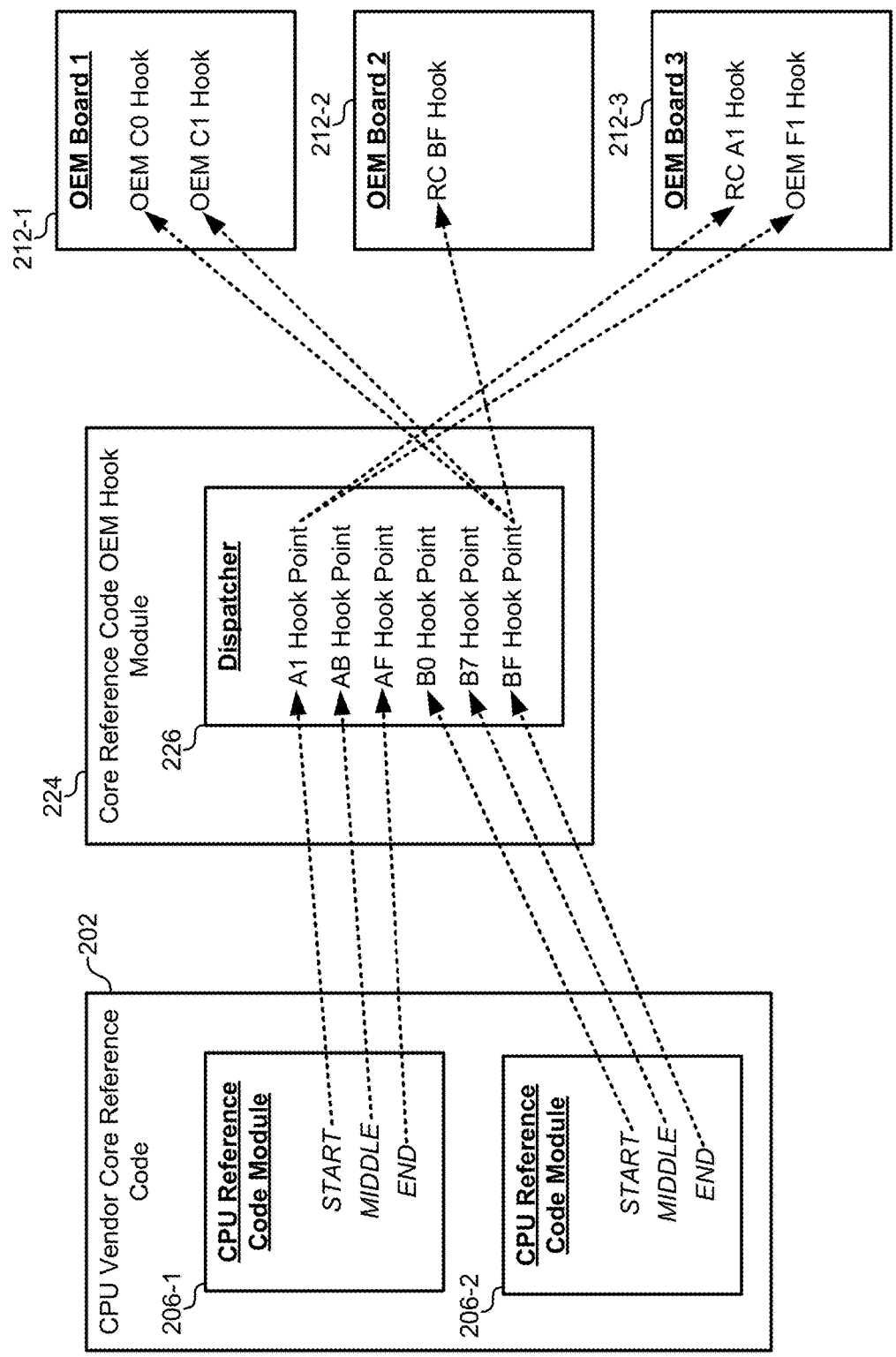
FIG. 5 illustrates an embodiment using unique IDs to service single reference code requests, according to some embodiments.

FIG. 5 illustrates an embodiment using unique IDs to service single reference code requests, according to some embodiments. Note that FIG. 2 illustrates many of the same code sections as FIG. 2; however, some elements have been omitted for clarity. It will be understood that any element from FIG. 2, such as the protocol interface, may continue to operate as described above in the operations described below. A CPU reference code module 206-1 has a START location associated with a unique ID generated a 0xA1 and illustrated in FIG. 4 as the "A1 Hook Point." The A1 Hook Point can then be forked into two new unique IDs labeled as 0xA1 and 0xF1. These two new unique IDs are referenced by the dispatcher 226 as "RC A1 Hook" and "OEM F1 Hook." These two new unique IDs are used to call into the OEM customization functions in the OEM customization modules of OEM Board 212-3 through the protocol interface. The CPU reference code module 206-1 can generated similar MIDDLE and END unique IDs for different corresponding execution points.

Similarly, CPU reference code module 206-2 has an END location associated with a unique ID generated a 0xBF and illustrated in FIG. 4 as the "BF Hook Point." The BF Hook Point can then be forked into three new unique IDs labeled as 0xBF, 0xC0, and 0xC1. These three new unique IDs are referenced by the dispatcher 226 as "RC BF Hook," "OEM C0 Hook," and "OEM C1 Hook," respectively. These three new unique IDs are used to call into the OEM customization functions in the OEM customization modules of OEM Boards 212-1 and 212-2 through the protocol interface. The CPU reference code module 206-1. The CPU reference code module 206-1 can generated similar START and MIDDLE unique IDs for different corresponding execution points.

Referring back briefly to FIG. 2, the OEM Hook Protocol Interface 228 may also use data buffer pointers of byte streams for the customization modules 218 of the OEM boards 212 to transmit data back to the CPU reference code module 206. Transmitting data in such a manner allows data to be exchanged between the CPU reference code modules 206 and the OEM boards 212 in any format and without needing to know the specific data format used by the CPU reference code modules 206 and/or the customization modules 218 of the OEM boards 212.

Some embodiments may be expanded at different module levels without affecting modules in other levels. More specifically, the CPU reference code modules 206 may define their own internal checkpoints that consume particular OEM customizations. If a targeted OEM customization module 212-1 does not have a module that services a request for a particular checkpoint, then the customization call from the source CPU reference code module 106-1 may instead become a no-op (NOP), which refers to a "no operation" by returning directly from the dispatch function 226 with a failed return status. Afterwards, similar requests targeting the same OEM customization module 212-1 can be prevented from being dispatched and/or called into the OEM customization modules 212 through the OEM hook protocol interface 228. However, an OEM process may assign and add a unique ID to the dispatch function 126 if the OEM needs to support a specific customization request from a given CPU reference code module.

Figure 6:
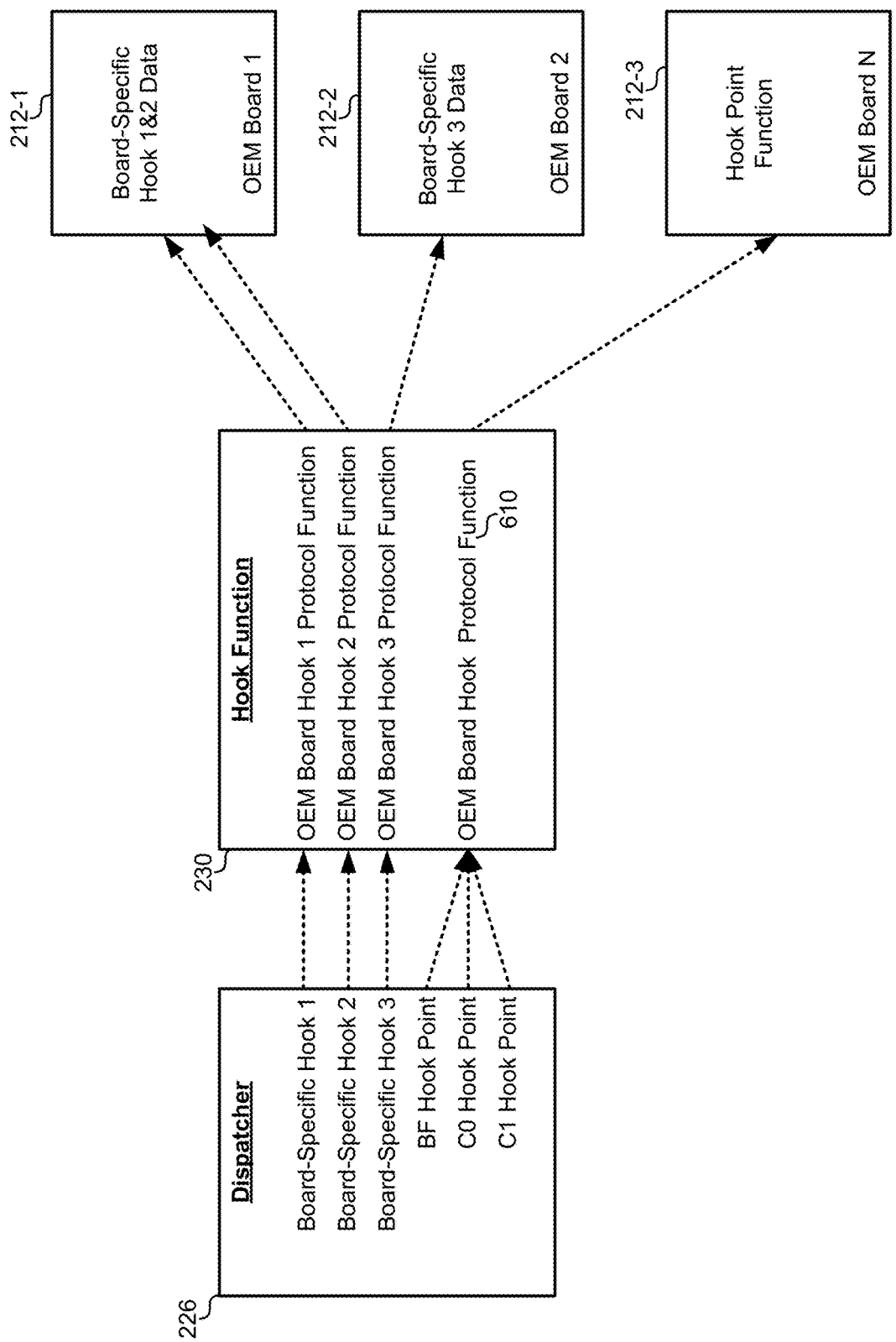
FIG. 6 illustrates an computer architecture that may be used to add an interface function, according to one embodiment.

At the OEM hook protocol interface 228, if a new reference code customization request cannot be serviced by the existing protocol interface functions, one or more new protocol interface functions may be added without affecting any existing interface functions. At the OEM customization modules 212, new OEM customization modules or functions may be added for new OEM boards separately, and may be supported by existing reference code requests with known unique IDs. FIG. 6 illustrates an computer architecture 600 that may be used to add an interface function, according to one embodiment. More specifically, FIG. 6 illustrates an example of expanding the OEM hook protocol interface 228 to add additional functions. In this example, the existing OEM Hook Point protocol functions in the hook function 230 can provide an interface between the reference code modules 206 at hook points BF, C0 and C1. These function signatures as implemented, however, may not be generic enough to provide a functional interface for all the reference code designs that require a board-specific customization. For example, the reference code OEM-board-specific hook 1, hook 2, and hook 3 may be too specific to be interfaced with existing less-specific protocol interface functions. By expanding the protocol hook point interface function 610, any reference code that requires an OEM customization can then be interfaced by more than one protocol function, based on their context and locations, which effectively avoids overloading other protocol functions to meet the interfacing needs of the reference code modules 206.

In some embodiments, the CPU reference code modules 206 may receive OEM-specific inputs, and the OEM boards 212 may apply product-specific feature overwrites for at least some of the reference codes. Any of these reference codes may interface with the dispatcher 226 through direct function calls into the dispatcher 226 within the context of the reference code modules 206 as described above. To avoid changing these reference codes that may require OEM input parameters or customizations directly, existing functions in reference codes can instead be called upon to output the reference code progress through an LED display on board the OEM circuit boards 212. For example, a "port80" code function known in the art can be issued.

In some embodiments, the host structure may be a parameter of one or more of the function calls. The host structure may include the reference code execution context, which in turn may include the reference code execution location information. A function call can be made to the dispatcher function 226 that passes in the reference code execution location as one of the parameter, along with the reference code execution context information as another parameter. When a reference code location does not call into the "port80" code function, but the OEM still requires a customization to this particular location, a new function call can added into the reference code from CPU vendor such that the OEM hook can be added. The parameters that may need to be created within the "port80" code function to call the dispatcher may be indicated by the following parameters sent to the dispatcher function 226.

```
EFI_STATUS OracleOemHooksPei (
    IN EFI_PEI_SERVICES **PeiServices,
    IN UINT64 HookPoint,
    IN VOID *Context,
    OUT UINT8 *StatusCode,
    OUT UINT8 **ResponseData,
    IN UINT8 *ResponseDataSize)
```

The GenericOemHookPei stub above represents a generic OEM hook function that can be used to locate an OEM hook PPI (e.g., Oracle® acting as the OEM) for the CPU vendor (e.g., Intel®) and execute hook-point-specific processing required and understood by the CPU vendor reference code.

Since the dispatcher can be executed within the context of reference code, it will have access to all knowledge of the reference code data structures and services included in the context provided by the host structure. In some embodiments, the dispatcher may extract the data structures and location information from the host structure context that may be necessary to interface with particular OEM-side modules based on (i) the type of customization required, and (ii) the reference code execution location information.

In some embodiments, the dispatcher 226 may interface with the OEM customization modules 218 through the OEM hook protocol interface 228 after mapping the reference code location information and data structures into a unique ID and the data structure parameters expected by a particular protocol function. Since the dispatcher 228 interfaces with the OEM customization modules 212 through the UEFI protocol of the OEM hook protocol interface 228, the OEM customization modules 218 may execute in their own context without depending on and/or even knowing the specifics of the reference code modules 206. The UEFI protocol interface provided by the OEM hook protocol interface 228 may be organized as follows.

```
static PEI_OEM_HOOKS_PPI gOemHooks = {
    OracleOemHooksPei,
    OracleGetBoardId,
    OemHooksGetEQTable,
    OemHooksGetGpioTable,
    OemHooksGetUsbTables};
```

Since the data exchanged between the OEM customization modules 218 and the reference code modules 206 may be required, the dispatcher 126 works as a "data marshaler" between these two entities. This allows the protocol interface 228 to continue to decouple the reference code modules 206 from the OEM customization modules 212. The dispatcher 126 may locate the data structure pointer in the reference code provided by the reference code modules 206 that requires specific OEM input values, and then cast this data structure pointer into a void pointer prior to passing it on to the OEM customization modules 212. The OEM side does not need to understand any reference-code-specific data formats; rather, it can execute using only OEM-specific data formats and/or structures for that particular function implementation. The dispatcher 226 may take an OEM data input and convert it back to a format required by the reference code modules 206 and vice-versa. For example, one of the reference code modules 206 may be designed to process CPU link transmitter equalization settings. The reference code modules 206 may only need a set of a few bytes (called "TAP" settings) for each link. These setting, however, may need to be provided by the OEM board. To facilitate this process, the dispatcher 226 may take the bytes representing these setting and convert them into data structures that are specific to the internal requirements of the reference code modules 206 where these parameters are stored and used in CPU link transmitter equalization.

Figure 7:
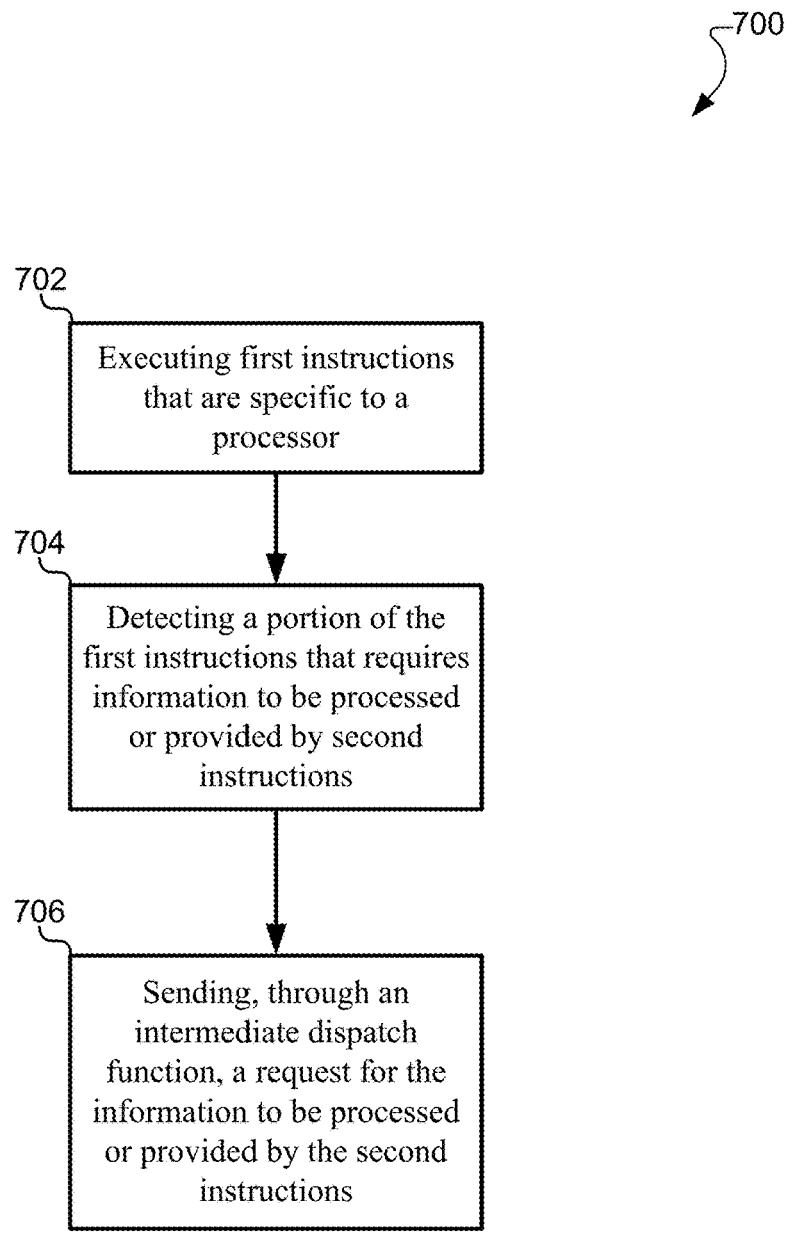
FIG. 7 illustrates a flowchart of a method for executing processor-specific code to include board-specific optimizations in a UEFI process.

FIG. 7 illustrates a flowchart of a method for executing processor-specific code to include board-specific optimizations in a UEFI process. The method may include executing first instructions that are specific to a processor (702). The first instructions may part of the CPU reference code modules 206 provided by the CPU vendor that are CPU and/or chipset specific. As used herein, the term processor may refer to a single processor, multiple processors, one or more multicore processors, and/or a chipset. These first instructions may be executed within the UEFI firmware routine The method may additionally include detecting a portion of the first instructions that requires information to be processed or provided by second instructions (704). The second instructions may be specific to a circuit board in which the processor is installed. For example, the second instructions may be executed by the customization modules 218 described above for individual OEM boards 212.

The method may further include sending, through an intermediate dispatch function, a request for the information to be processed or provided by the second instructions (706). The intermediate dispatch function may be comprised of any combination of the core reference code OEM hook module 224, the dispatcher 226, the OEM hook protocol interface 228, and/or the hook function 230 of FIG. 2. The intermediate dispatch function can serve to isolate or decouple the first instructions from the second instructions. This decoupling allows the first instructions to be written and executed without knowledge of the operation and/or optimizations performed by the customization modules 218 using the second instructions. Using the unique IDs, forked processes, hook functions, and/or void pointers described above, information can effectively be passed back and forth between the first and second instructions while maintaining this decoupling.

It should be appreciated that the specific steps illustrated in FIG. 7 provide particular methods of executing processor-specific code to include board-specific optimizations in a UEFI according to various embodiments of the present invention. Other sequences of steps may also be performed according to alternative embodiments. For example, alternative embodiments may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of executing processor-specific code to include board-specific optimizations in a Unified Extensible Firmware Interface (UEFI), the method comprising:
    executing first instructions in a reference code module, wherein the first instructions in the reference code module are part of a UEFI firmware routine and specific to a current processor;
    detecting a portion of the first instructions that requires information to be processed or provided by second instructions within the UEFI, wherein the second instructions are part of a circuit board module that is specific to a circuit board on which the processor is installed;
    sending, through an intermediate dispatch function, a request from the reference code module to the circuit board module for the information to be processed or provided by the second instructions, wherein the intermediate dispatch function decouples the reference code module from the circuit board module, and wherein the request comprises a reference to an execution context of the first instructions that requires board-specific processing; and
    receiving, through the intermediate dispatch function, results from the second instructions, wherein the intermediate dispatch function receives a void pointer from the second instructions that references the results of the second instructions, and the intermediate dispatch function casts the void pointer into a datatype required by the first instructions.

2. The method of claim 1, further comprising:
    continuing execution of the first instructions.

3. The method of claim 1, further comprising:
    receiving, through the intermediate dispatch function, an indication that the second instructions have successfully executed; and
    continuing execution of the first instructions.

4. The method of claim 1, wherein the reference code module was received from a manufacturer of the processor.

5. The method of claim 1, wherein the circuit board module was received by a manufacturer of the circuit board.

6. The method of claim 1, wherein the intermediate dispatch function does not require any static links between the first instructions and the second instructions.

7. The method of claim 1, wherein the information to be processed or provided by the second instructions comprises a set of initialization parameters.

8. The method of claim 1, wherein the execution context of the first instructions comprises chipset devices and subcomponent topology data that require a board-specific initialization.

9. The method of claim 1, wherein the execution context of the first instructions comprises chipset configuration policy tokens that require a board-specific override.

10. The method of claim 1, wherein the execution context of the first instructions comprises chipset initialization health data that requires board-specific processing.

11. The method of claim 1, further comprising:
    casting, by the intermediate dispatch function, the execution context of the first instructions into a void pointer, such that the second instructions are not required to use data structures that are specific to the first instructions.

12. The method of claim 1, further comprising:
    generating, at the intermediate dispatch function, a unique ID for the request.

13. The method of claim 12, further comprising:
    passing the unique ID to the second instructions as a function parameter in a call stack.

14. The method of claim 12, further comprising:
    generating, at the intermediate dispatch function, a plurality of unique IDs from the unique ID that are assigned to forked processes executed by the second instructions.

15. The method of claim 14, wherein each of the plurality of unique IDs target specific board-specific customization functions.

16. The method of claim 1, wherein the processor comprises a CPU or chipset.

17. A non-transitory, computer-readable medium comprising instructions that, when executed by one or more processors, causes the one or more processors to perform operations comprising:
    executing first instructions in a reference code module, wherein the first instructions in the reference code module are part of a UEFI firmware routine and specific to a current processor;
    detecting a portion of the first instructions that requires information to be processed or provided by second instructions within the UEFI, wherein the second instructions are part of a circuit board module that is specific to a circuit board on which the processor is installed;
    sending, through an intermediate dispatch function, a request from the reference code module to the circuit board module for the information to be processed or provided by the second instructions, wherein the intermediate dispatch function decouples the reference code module from the circuit board module, and wherein the request comprises a reference to an execution context of the first instructions that requires board-specific processing; and
    receiving, through the intermediate dispatch function, results from the second instructions, wherein the intermediate dispatch function receives a void pointer from the second instructions that references the results of the second instructions, and the intermediate dispatch function casts the void pointer into a datatype required by the first instructions.

18. The non-transitory computer-readable medium according to claim 17 wherein the execution context of the first instructions comprises chipset devices and subcomponent topology data that require a board-specific initialization.

19. The non-transitory computer-readable medium according to claim 17 wherein the execution context of the first instructions comprises chipset configuration policy tokens that require a board-specific override.

20. The non-transitory computer-readable medium according to claim 17 wherein the execution context of the first instructions comprises chipset initialization health data that requires board-specific processing.

21. The non-transitory computer-readable medium according to claim 17 comprising additional instruction that cause the one or more processors to perform additional operations comprising:
    casting, by the intermediate dispatch function, the execution context of the first instructions into a void pointer, such that the second instructions are not required to use data structures that are specific to the first instructions.

22. The non-transitory computer-readable medium according to claim 17, comprising additional instruction that cause the one or more processors to perform additional operations comprising:
    continuing execution of the first instructions.

23. The non-transitory computer-readable medium according to claim 17, comprising additional instruction that cause the one or more processors to perform additional operations comprising:
receiving, through the intermediate dispatch function, an indication that the second instructions have successfully executed; and
continuing execution of the first instructions.

24. The non-transitory computer-readable medium according to claim 17, wherein the reference code module was received from a manufacturer of the processor.

25. The non-transitory computer-readable medium according to claim 17, wherein the circuit board module was received by a manufacturer of the circuit board.

26. The non-transitory computer-readable medium according to claim 17, wherein the intermediate dispatch function does not require any static links between the first instructions and the second instructions.

27. The non-transitory computer-readable medium according to claim 17, wherein the information to be processed or provided by the second instructions comprises a set of initialization parameters.

28. The non-transitory computer-readable medium according to claim 17, comprising additional instruction that cause the one or more processors to perform additional operations comprising:
generating, at the intermediate dispatch function, a unique ID for the request.

29. The non-transitory computer-readable medium according to claim 28, comprising additional instruction that cause the one or more processors to perform additional operations comprising:
passing the unique ID to the second instructions as a function parameter in a call stack.

30. The non-transitory computer-readable medium according to claim 28, comprising additional instruction that cause the one or more processors to perform additional operations comprising:
generating, at the intermediate dispatch function, a plurality of unique IDs from the unique ID that are assigned to forked processes executed by the second instructions.

31. The non-transitory computer-readable medium according to claim 30, wherein each of the plurality of unique IDs target specific board-specific customization functions.

32. The non-transitory computer-readable medium according to claim 17, wherein the processor comprises a CPU or chipset.

33. A system comprising:
one or more processors; and
one or more memory devices comprising instructions that, when executed by the one or more processors, cause the one or more processors to perform operations comprising:
executing first instructions in a reference code module, wherein the first instructions in the reference code module are part of a UEFI firmware routine and specific to a current processor;
detecting a portion of the first instructions that requires information to be processed or provided by second instructions within the UEFI, wherein the second instructions are part of a circuit board module that is specific to a circuit board on which the processor is installed;
sending, through an intermediate dispatch function, a request from the reference code module to the circuit board module for the information to be processed or provided by the second instructions, wherein the intermediate dispatch function decouples the reference code module from the circuit board module, and wherein the request comprises a reference to an execution context of the first instructions that requires board-specific processing; and
receiving, through the intermediate dispatch function, results from the second instructions, wherein the intermediate dispatch function receives a void pointer from the second instructions that references the results of the second instructions, and the intermediate dispatch function casts the void pointer into a datatype required by the first instructions.

34. The system of claim 33, wherein the one or more memory devices further comprise additional instructions that cause the one or more processors to perform additional operations comprising:
generating, at the intermediate dispatch function, a unique ID for the request.

35. The system of claim 34, wherein the one or more memory devices further comprise additional instructions that cause the one or more processors to perform additional operations comprising:
passing the unique ID to the second instructions as a function parameter in a call stack.

36. The system of claim 34, wherein the one or more memory devices further comprise additional instructions that cause the one or more processors to perform additional operations comprising:
generating, at the intermediate dispatch function, a plurality of unique IDs from the unique ID that are assigned to forked processes executed by the second instructions.

37. The system of claim 36, wherein each of the plurality of unique IDs target specific board-specific customization functions.

38. The system of claim 33, wherein the processor comprises a CPU or chipset.

39. The system of claim 33, wherein the one or more memory devices further comprise additional instructions that cause the one or more processors to perform additional operations comprising:
continuing execution of the first instructions.

40. The system of claim 33, wherein the one or more memory devices further comprise additional instructions that cause the one or more processors to perform additional operations comprising:
receiving, through the intermediate dispatch function, an indication that the second instructions have successfully executed; and
continuing execution of the first instructions.

41. The system of claim 33, wherein the reference code module was received from a manufacturer of the processor.

42. The system of claim 33, wherein the circuit board module was received by a manufacturer of the circuit board.

43. The system of claim 33, wherein the intermediate dispatch function does not require any static links between the first instructions and the second instructions.

44. The system of claim 33, wherein the information to be processed or provided by the second instructions comprises a set of initialization parameters.

45. The system of claim 33, wherein the execution context of the first instructions comprises chipset devices and sub-component topology data that require a board-specific initialization.

46. The system of claim 33, wherein the execution context of the first instructions comprises chipset configuration policy tokens that require a board-specific override.

47. The system of claim 33, wherein the execution context of the first instructions comprises chipset initialization health data that requires board-specific processing.

48. The system of claim 33, wherein the one or more memory devices further comprise additional instructions that cause the one or more processors to perform additional operations comprising:

casting, by the intermediate dispatch function, the execution context of the first instructions into a void pointer, such that the second instructions are not required to use data structures that are specific to the first instructions.

* * * * *